Patented Jan. 4, 1944

2,338,380

UNITED STATES PATENT OFFICE 2,338,380

INSECTICIDAL COMPOSITION

William F. Hester, Drexel Hill, and W E Craig, Philadelphia, Pa., assignors to Röhm & Haas Company, Philadelphia, Pa., a corporation of Delaware No Drawing. Application November 28, 1940, Serial No. 367,569

9 Claims. (Cl. 167—30)

This invention relates to insecticidal compositions having as an active principle a compound of the formula

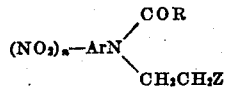

wherein Ar is an aryl nucleus of the benzene or naphthalene series, Z is a member of the class consisting of —OH, —OR, and —OCOR, and $n$ is an integer having a value from one to two inclusive, R representing a hydrocarbon group from the aliphatic, aromatic, or alicyclic series, such as methyl, ethyl, allyl, propyl, isopropyl, butyl, methallyl, octyl, undecenyl, dodecyl, octadecenyl, octadecyl, benzyl phenyl, methyl phenyl, naphthyl, napthenyl, abietyl, etc.

Compounds of the above type may be prepared by various known procedures, such as the reaction of a nitrochlorobenzene or nitrobromonaphthalene with ethanolamine in the presence of an alkali, and conversion of the resulting ethanolic compound to an ether or ester. In some cases a nitroaniline may be reacted with an ether halide or ester of a halohydrin, such as phenoxyethyl chloride, ethoxyethyl chloride, or the acetate of chlorohydrin to yield compounds of the formula

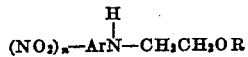

and

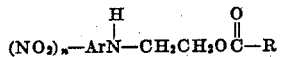

Compounds of this type may be acylated to introduce on the amine nitrogen a —COR group in place of the hydrogen.

To illustrate the preparation of typical compounds, the following examples are given.

Example 1

A mixture of 157.5 parts of o-nitrochlorobenzene, 61 parts of ethanolamine, and 212 parts of soda ash was stirred and heated under reflux for 8 hours, and thereafter steam distilled, leaving a tarry residue, which was taken up in hot benzene. On cooling, 90 parts of crystals were obtained, having a melting point of 73–74° C., and corresponding to the formula

Example 2

A mixture of 200 parts of 2,4-dinitrochlorobenzene, 980 parts of 95% ethanol, 60 parts of ethanolamine, 60 parts of water, and 40 parts of sodium hyroxide was stirred and heated under reflux for one hour, whereupon the mixture was cooled, filtered, and concentrated. The product recrystallized from alcohol, melts at 87–88° C. and has the composition

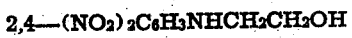

Example 3

(a) 36 parts of the product from Example 1, 100 parts of glacial acetic acid, 22 parts of acetic anhydride, and a trace of concentrated sulfuric acid were mixed and refluxed for two hours. The reaction mixture was cooled and poured into ice water, with the formation of a solid, which was separated by filtration, washed with water, and crystallized from alcohol to give 36 parts of a solid melting at 61–62° C. and corresponding to

(b) Another 36 parts of product from Example 1 was reacted with 100 parts of glacial acetic acid, 45 parts of acetic anhydride, and a small amount of sulfuric acid under reflux for five hours, and then treated as above. The solid obtained, amounting to 30 parts, melted at 64–65° C. When mixed crystals from 3a above, a mixed melting point of 45–50° C. was obtained. The product corresponds in composition to

It has been found that compounds of the geneal formula above may be applied as insecticides against a wide variety of insects. They may be applied in the form of solutions in organic solvents, in the form of aqueous emulsions, in the form of dusts, or in the form of sprays in which the compounds are carried on a finely divided solid. The form of the preparation to be used will depend primarily upon the type of insect to be combated. Against soft-bodied insects, for instance, it is usually desirable to dissolve the insecticidal agent in an organic solvent and apply it in this form or in the form of an emulsion by adding a suitable emulsifying agent, such as a sulfonated oil.

A useful spray of the latter type may be prepared by dissolving one part of the toxicant with one part of emulsifying agent in two parts of pine oil and extending this preparation with 100 to 400 parts of water. This gives an effective concentration of toxicant of one part in 400 to one part in 1600.

Various compounds were spread on finely divided solids by dissolving the compounds in inert solvents, mixing the solution with the solid, and evaporating the solvent while the mixture was stirred. The compounds may also be spread on solids by mixing the toxicant with a solid or fusing a toxicant with an inert solid and grinding the mixture. A spray containing one part of active agent, two parts of magnesium carbonate, one-half part of a condensed sulfonated alkyl phenoxyethanol sulfate as a spreader, and 96.5 parts of water was applied to bean plants. Twenty-four hours later Mexican bean beetle larvae were applied to the plants and after a second twenty-four hours' observation was made of the effect of the toxicant on the larvae, counts being made of the insects which had fallen from the plant, dead or no longer capable of feeding on it. Results were as follows:

Compound                                                           Control
2,4—(NO$_2$)$_2$C$_6$H$_3$N(COCH$_3$)CH$_2$CH$_2$OCOCH$_3$_          99

Similar results were obtained by applying the toxicants in dusts, which were also prepared by spreading the active agent at concentrations of ½% to 10% on a finely divided solid. Typical formulae for dusts are:

|   | Parts |
|---|---|
| A. Toxicant | 1 |
| Talc | 98 |
| Spreader | 1 |
|   |   |
| B. Toxicant | 1 |
| Alum sludge | 48 |
| Lime | 48 |
| Soya bean oil | 3 |

In the foregoing examples the various ethanol derivatives of the nitroanilines have been shown as the sole toxic ingredient in insecticidal compositions. They may, however, also be used in conjunction with other insecticidal principles and fungicidal agents to give a single improved effect or to give a plurality of effects. Typical additional agents which may be used include rotenone, pyrethrins, nicotine, organic thiocyanates, other nitro aryl derivatives, arsenates, copper compounds, oils from petroleum, tar, animal, and vegetable origin, etc.

We claim:
1. An insecticidal composition containing as an active principle a compound of the formula

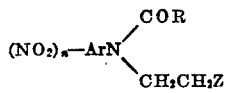

wherein Ar is an aryl nucleus selected from a member of the benzene and naphthalene series, Z is a member of the class consisting of —OH, —OR, and —OCOR groups, and $n$ is an integer having a value from one to two inclusive, R being a hydrocarbon group selected from the aliphatic, aromatic, and alicyclic series.

2. An insecticidal composition containing as an active principle a compound of the formula

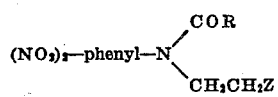

wherein Z is a member of the class consisting of —OH, —OR, and —OCOR groups, R being a hydrocarbon group selected from the aliphatic, aromatic, and alicyclic series.

3. An insecticidal composition comprising as an active principle a compound of the formula

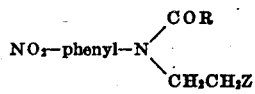

wherein Z is a member of the class consisting of —OH, —OR, and —OCOR groups, R being a hydrocarbon group selected from the aliphatic, aromatic, and alicyclic series.

4. An insecticidal composition containing as an active principle a compound of the formula

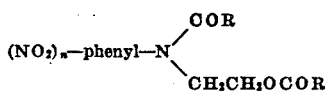

wherein $n$ is an integer from one to two inclusive, and R is a hydrocarbon radical selected from the aliphatic, aromatic, and alicyclic series.

5. An insecticidal composition containing as an active principle a compound of the formula

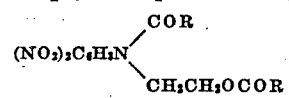

wherein R is an alkyl group.

6. An insecticidal composition containing as an active principle a compound of the formula

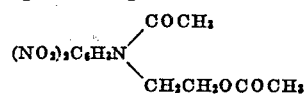

7. An insecticidal composition containing as an active ingredient a compound of the formula

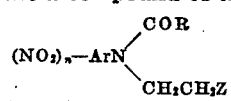

wherein Ar is an aryl nucleus selected from a member of the benzene and naphthalene series, Z is a member of the class consisting of —OH, —OR, and —OCOR groups, $n$ is an integer having a value from one to two, inclusive, and R is a hydrocarbon group selected from the aliphatic, aromatic, and alicyclic series, said active ingredient being dispersed in an aqueous emulsion.

8. A process of controlling soft-bodied insects on living plants which comprises spraying plants infested with said insects with an aqueous emulsion containing in dispersed form a compound of the formula

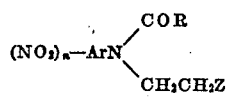

wherein Ar is an aryl nucleus selected from a member of the benzene and naphthalene series, Z is a member of the class consisting of —OH, —OR, and —OCOR groups, $n$ is an integer having a value from one to two, inclusive, and R is a hydrocarbon group selected from the aliphatic, aromatic, and alicyclic series.

9. A process of controlling soft-bodied insects on living plants which comprises spraying plants infested with said insects with an aqueous emulsion containing in dispersed form a compound of the formula

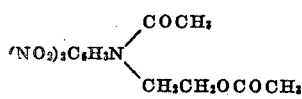

WILLIAM F. HESTER.
W E CRAIG.